March 13, 1962  J. M. CALLAN ET AL  3,025,460
ROTATING PROBE

Filed Dec. 8, 1959  2 Sheets-Sheet 1

INVENTORS
JOSEPH M. CALLAN
EDWARD D. SPIERER
BY Pennie, Edmonds,
Morton, Barrows & Taylor.
ATTORNEYS

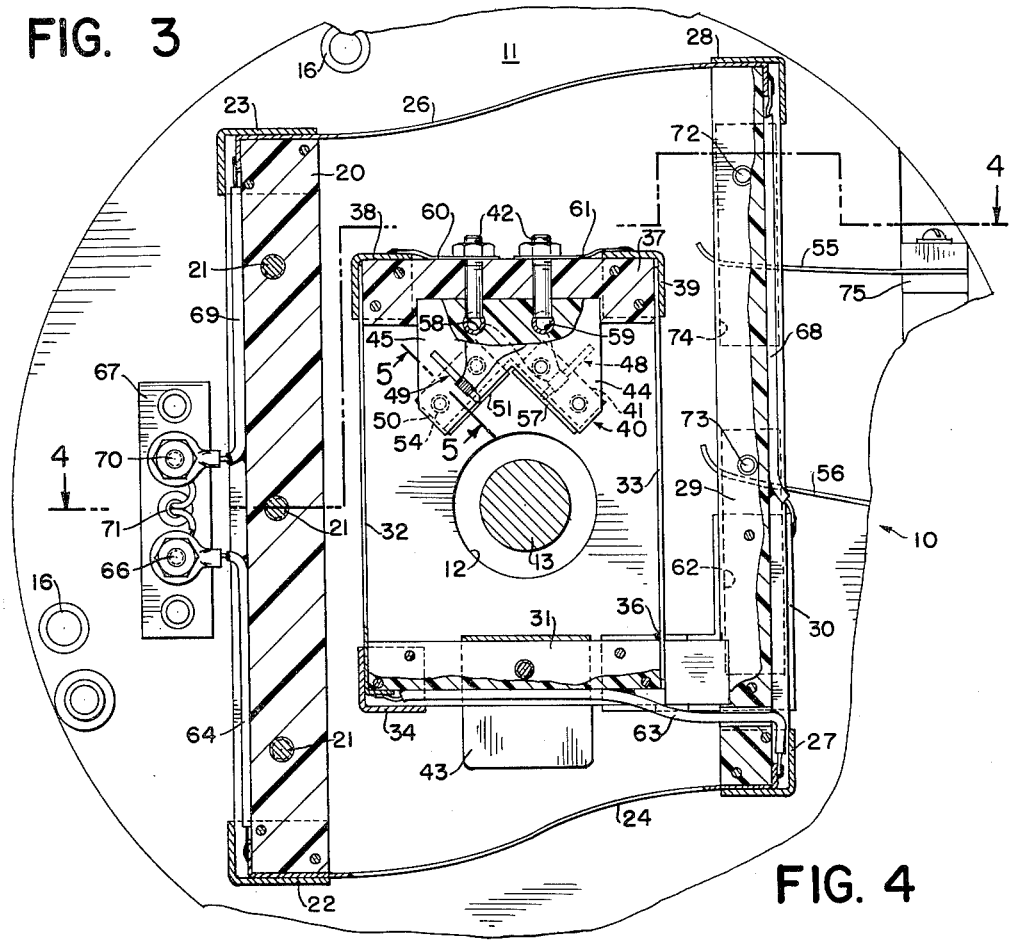

United States Patent Office 3,025,460
Patented Mar. 13, 1962

3,025,460
ROTATING PROBE
Joseph M. Callan, Pelham Manor, and Edward D. Spierer, Brooklyn, N.Y., assignors to Magnetic Analysis Corporation, Long Island City, N.Y., a corporation of New York
Filed Dec. 8, 1959, Ser. No. 858,253
11 Claims. (Cl. 324—37)

This invention relates generally to mechanisms for sensing flaws in wire or the like, and more specifically, to improvements in mounting means for a rotatable probe, the latter being adapted to sense the strength of or irregularities in the magnetic field of a wire or the like, due to eddy currents in the surface of such material, which may then be interpreted in terms of the structural integrity or composition of the wire.

Rotating probes for detecting flaws in wire and rod have been heretofore known. Generally, probes of this type possess one or more sensing units which are rotated about the wire or other material to be tested for flaws. The magnetic field of the wire is established by suitable means, such as by induction from the probe. Since local field strength is related to the structural integrity or composition at each point of the wire being tested, the resulting current in the probe may be transmitted to a suitable indicating apparatus, and the signal current interpreted in terms of the presence or absence of flaws or other characteristics in the wire. It is important that the spacing of the sensing unit or units from the surface of the wire be accurately maintained at a given constant value, since field strength will also vary according to the distance from the sensing units to the wire.

The present invention is directed to an improved probe including novel mounting means for the sensing head for use in a flaw detection system of the type described.

Reference is made in this connection to copending application Serial No. 838,106 filed September 4, 1959, describing a sensing system in which the rotating probe of the invention may be advantageously used.

Accordingly, a broad purpose of the present invention is to provide mounting means for the probe head including its sensing elements which will permit the head as a unit to possess resilient freedom in the plane of rotation. This freedom allows the probe to follow variations in the peripheral concentricity of the wire with the center of rotation as it passes co-axially through the device. Thus, a constant spatial relationship between the sensing elements of the probe and the wire surface may be maintained, with resulting improved accuracy of the flaw detection system as a whole. Furthermore, the mounting or support of the wire itself may be facilitated since some flexibility in the wire or minor departures of the wire from the geometric center of rotation of the probe may be tolerated.

Another feature related to the foregoing provision, is that the probe is provided with strips of bearing material which ride directly upon the surface of the wire or other material as it is passed axially through the probe. This further assures the accuracy of the sensed indications because the spacing of the sensing elements relative to the material being tested is determined precisely and solely by the thickness of the bearing material.

Another feature is the provision of sensing elements which are spaced longitudinally of each other with respect to the axis of the wire so as to provide a plurality of scanning paths in the form of parallel helices about the length of wire as it is tested. Furthermore, the disposition of the individual sensing elements with respect to the axis of rotation may be such that one will be at a position to sense wire of a fairly small diameter while the other is at a position to sense wire of larger diameter. This combined spacing of the sensing elements permits satisfactory sensing of wire having any diameters ranging between the mentioned larger and smaller diameters.

These and other aspects of the invention will become more readily apparent upon consideration of the following detailed description and of the accompanying drawings in which:

FIG. 3 is an enlarged view partly broken away, and similar to FIG. 1 except that the sensing elements are equally spaced, showing the electrical connections between the sensing elements in the sensing head and terminals on the probe mounting plate;

FIG. 4 is a sectional view taken along the lines 4—4 of FIG. 3 showing a part of the mounting provisions for the sensing head; and FIG. 5 is a detail view showing one of the probe sensing elements and an adjacent bearing member which determines the spatial relationship between the element and the material being tested.

Figure 1:
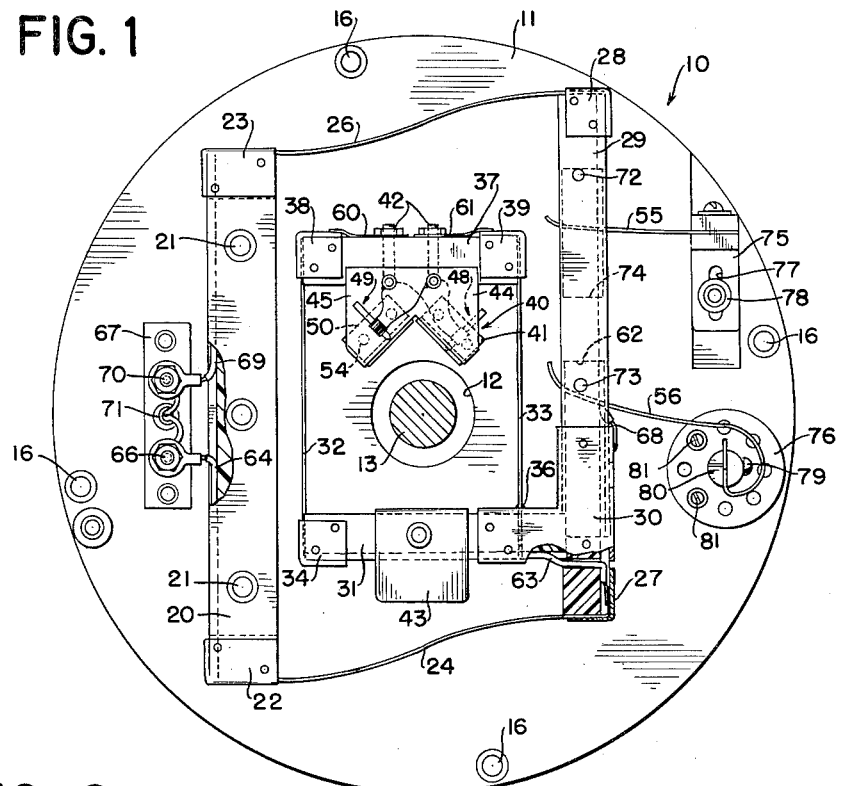
FIG. 1 shows a resiliently mounted rotatable probe constructed according to the invention, when the component parts thereof are at rest.

Referring now to the drawings, reference numeral 10 designates a rotatable probe assembly constructed according to the invention. Probe 10 comprises a circular mounting plate 11 of heavy fiber or other rigid insulating material, having a centrally located aperture 12 therethrough. It may be of metal if preferred. A wire or rod 13, which is to be tested for flaws, is adapted to be passed through aperture 12 axially of the mounting plate 11. As shown more specifically in FIG. 4, mounting plate 11 is fixedly attached to an appropriate supporting structure such as a steel reinforcing plate 14 by a series of circumferentially positioned bolts 16. Mounting plate 11 and its reinforcing plate 14 are adapted to be rotated by suitable drive means such as an attached sheave (not shown) in the direction indicated by the arrow in FIG. 2.

A fixed mounting bar 20 of insulating material is rigidly attached to the plate 11 by means of three bolts 21. Metal caps 22 and 23 are riveted to the extremities of mounting bar 20 in order to secure the ends of two generally horizontally extending leaf springs 24 and 26, which are locked between them and the ends of the bar. At the opposite ends of leaf springs 24 and 26, and similarly affixed thereto by means of end caps 27 and 28, is a resiliently movable vertically positioned bar 29 which is similar in construction to mounting bar 20. It will, therefore, be apparent that the bar 29 has a degree of resilient freedom in a vertical direction and that it is maintained substantially parallel to the bar 20 during its movement.

Rigidly attached to the movable bar 29 by means of an L-shaped bracket 30 is a lower horizontal bar 31 of insulating material. Bracket 30 actually comprises two L-shaped channel plates on the top and bottom of bar 29, which are tied together by rivets through the bar. Bar 31 supports two vertically extending leaf springs 32 and 33 which are attached to spaced portions thereof. Spring 32 is secured under an end cap 34, and the lower end of spring 33 passes through a slot in bar 31 and is secured to bracket 30 by weld 36. The upper ends of springs 32 and 33 are in turn attached to an upper horizontal rigid insulating bar 37 by means of two end caps 38 and 39. The words "vertical" and "horizontal" are used above only because the members so designated are shown in those positions in the drawings. Thus, the upper horizontal bar 37 has limited resilient freedom in a horizontal direction. It will be observed that the described components form two generally congruent quadrilaterals which (in the operative position of FIG. 2) have the aperture 12 in the plate 11 as their common center through which the wire to be tested passes.

Figure 2:
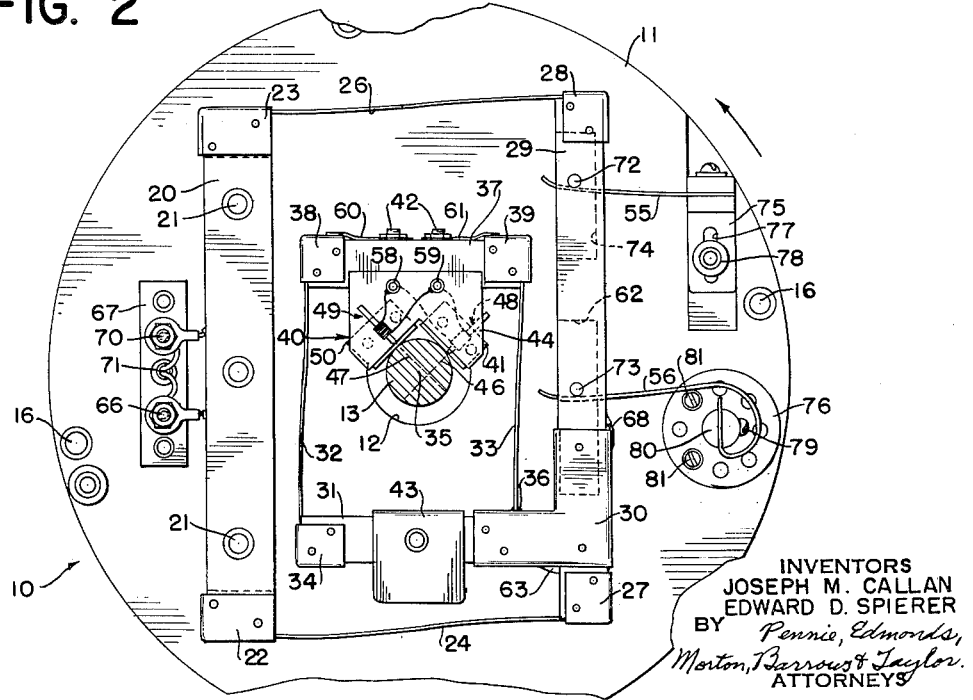
FIG. 2 is a view similar to FIG. 1 showing the probe as it would appear when it is being rotated and in position to sense flaws in the material being tested.

By comparison of FIGS. 1 and 2, it will be seen that springs 24 and 26, in their relaxed (FIG. 1) positions have a reverse curve, and in their sprung (FIG. 2) positions are nearly straight. This arrangement increases the rigidity of the structure during rotation. In all positions bars 20 and 29 remain parallel and bars 31 and 37 remain parallel.

The sensing portions of the probe form a sensing head, generally indicated by reference numeral 40, which depends from the horizontal bar 37 and is attached thereto by bolts 42. Attached to lower bar 31 is a counterweight 43, the purpose of which will be later described. Sensing head 40 comprises two block arms 44 and 45 of insulating material, which are shaped to form a 90° inverted V. Block arms 44 and 45 form mounting supports for two sensing elements 48 and 49 which are attached to the respective block arms, and are best seen in FIG. 4.

The sensing elements 48 and 49 do not touch the material to be tested, but are closely spaced therefrom by two bearing strips 51, 57 of T-shaped construction, which are embedded within the block arms 44 and 45 (see FIG. 5). Bearing strips 51, 57 which may advantageously be composed of very hard material such as Carboloy, have rounded bearing faces which ride upon the surface of the wire 13. The strips are removable from the block arms by releasing the clamping pressure applied by a series of set screws 54 to their stem plates 50, 41.

Each of sensing elements 48 and 49, one of which is shown in FIG. 5, comprises a small rod-shaped core 52 about which is wound an inductance coil 53 of extremely fine wire. A typical core may have a diameter of about $\frac{1}{16}$ inch, and be of ferrite sharpened to a chisel point. In the operative position shown in FIG. 2, the center lines 46 and 47 of the cores 52 are slightly misaligned with the radii of the wire being tested, although the planes of the turns of wire in coils 53 are substantially perpendicular to the cores 52. With this arrangement nearly maximum current will be induced in the coils 53 due to the eddy-current field. It will be noted that center line 46 is outside the center of rotation 35 and center line 47 is inside the center, when a wire of this illustrated diameter is tested. This means that one of the cores 52 will align with the radius of a wire of one diameter and that the core of the other sensing element will align with the radius of a wire of a different diameter. This arrangement has the advantage that wires of different diameters within a range determined by the different radial alignment of the cores may be tested without changing the position of the sensing elements, because the end of at least one core will be close to the surface being tested. If maximum signals are required, both cores should be spaced to align with a radius of the wire being tested, viz, the cores are normal to the tangents represented by bearing strips 51 and 57, as shown in FIG. 3.

FIG. 3 shows the electrical connections for conducting the electrical information sensed by the elements 48 and 49 to a suitable indication system, such as the one above referred to. It will be noted that the rigid horizontal and vertical bars 20, 29, 31 and 37 are constructed of a non-conducting material. "Bakelite" is suitable. The coils 53 (FIG. 5) of sensing elements 48 and 49 are connected to terminals 58 and 59 (FIG. 3) which form part of attaching bolts 42. The upper ends of bolts 42 connect to metal straps 60 and 61, respectively, which are, in turn, connected to the vertical springs 32 and 33. Thus, the current from element 49 passes through strap 60 to spring 32. Spring 32 is connected to a wire 63, therefrom to the lower horizontal leaf spring 24, and thence to a wire 64 making contact with terminal 66 on block 67 mounted to the plate 11. Current from sensing element 48 flows through strap 61, leaf spring 33, through the bracket 30 to a wire 68, therefrom to the upper leaf spring 26 and through wire 69 to a terminal 70 on the terminal block 67.

As shown in FIG. 4, the current from terminal 66 is conducted by means of a wire 71 to an external circuit including indicating means (not shown). A similar connection (not shown) is made from terminal 70 to the external circuit.

The invention also provides biasing means for automatically shifting the sensing head and its supporting components away from the central aperture 12 when the probe is at rest. This shifting means includes leaf springs 55 and 56 which are positioned to successively engage pins 72 and 73, projecting from the rear face of the vertical bar 29. As shown in FIG. 4, pin 72 extends through the vertical bar 29 into a guide groove 74 located in plate 11. Pin 73 extends into a similar groove 62.

The ends of springs 55 and 56, opposite their engagement with pins 72 and 73, are attached respectively to mounting members 75 and 76. Mounting member 75 is provided with an elongated slot 77 and a clamping screw 78, which permits limited movement of the mounting member 75, and thus permits adjustment of the spring force provided by the spring element 55 on pin 72. A clamping screw 79 in slotted stud 80 secures a wound portion of the spring 56 to the mounting member 76. Adjustment of this spring can be had by removing screws 81, turning the mounting and replacing the screws in different holes.

The operation of the device is as follows:

FIG. 1 shows the rotating probe assembly as it would appear at rest. In this position shifting spring 56, last described, engages pin 73 and causes the entire resilient quadrilateral arrangement to be biased upwardly, thereby permitting free access to the aperture 12 through plate 11. In this position, the wire 13 may be passed axially through the probe structure. The mounting plate 11 will then be set into rotation by appropriate means such as a belt drive from an adjacent motor (not shown). As rotation increases, centrifugal force due to counterweight 43 will cause the sensing head 40 to shift on plate 11 to the position shown in FIG. 2, thus acting against the spring force exerted by the spring elements 55 and 56. Spring 55 acts against pin 72 when the head has shifted nearly into operating position.

The force which causes the sensing head 40 to shift toward the center aperture 12 is a function of rotational velocity, the mass of the various components within the congruent quadrilaterals, and their distance from the center. The most important factor is the counterweight 43 which is purposely made greater in mass than the sensing head 40. This has the effect during rotation, of causing the sensing head 40 to be drawn toward the center of rotation. As above stated, the adjustable mounting member 75 may be shifted along the screw 78 to change the bias of spring 55. By this means, the pressure with which, at any given r.p.m., the sensing head 40 will exert against the surface of the wire may be adjusted.

When the probe has reached a predetermined r.p.m., the rounded bearing surfaces 51 of bearing strips 50 will ride upon the outer surface of the wire 13. This wire should be moved axially through the probe at a speed which will assure an adequate scanning of the surface thereof by means of the longitudinally spaced elements 48 and 49. Since the sensing elements are spaced axially relative to each other, the paths followed by the sensing elements relative to the surface of the wire as it passes through the probe, will be those of parallel helices. If eddy currents are induced in the wire from uniform energizing current in the probe coils, lines of force due to the eddy currents will in turn induce varying currents in the coils 55 thereby modifying the impedance of the probe coils. The induced currents from sensing elements 48 and 49 connected in parallel, flow from the sensing head 40 through the electrical connections shown in FIG. 3 to the terminal block 67. The electrical signals from these coils are preferably coupled through a rotating transformer (not shown) to the mentioned indicating apparatus.

A particular advantage provided by the resilient mounting of the sensing head 40 is that the head is thereby permitted two degrees of freedom in the plane of rotation. This resilient freedom enables the sensing portion of the probe, first, to align itself automatically so that both pickup elements are in correct operating position, and second, to follow departures of the wire from the geometric center of probe rotation. Hence, the accuracy of the final test readings will be increased and possible injury to the wire itself reduced. A further advantage is that it is not essential to provide the same degree of rigidity to the wire being tested as was formerly necessary, since some flexibility in the wire may now be tolerated. These advantages are increased by the exact spatial positioning of the sensing elements from the wire by using the described bearing strips.

It should be understood that the specific description above given relates to a preferred embodiment only and is merely representative of the invention. Hence, in order to determine accurately the spirit and scope of the invention, reference should be made to the appended claims.

We claim:

1. A rotating probe for testing flaws in wire or the like comprising mounting means having an aperture adapted to permit the passage of said wire axially therethrough, said mounting means being generally concentrically rotatable about said wire, a sensing head resiliently attached to said mounting means, rotatable therewith, and movable in a single plane radially in all directions with respect to the center of rotation of said mounting means, and means for radially moving said sensing head in response to centrifugal force depending on the rate of rotation of said mounting means.

2. A rotating probe for testing flaws in wire or the like comprising mounting means having a central aperture adapted to permit the passage of said wire axially therethrough, said probe being concentrically rotatable about said wire, a sensing head, resilient means attaching said sensing head to said mounting means, rotatable therewith and movable in a single plane radially in all directions with respect to the center of rotation, said sensing head having secured thereto means for contacting the surface of said wire such that said sensing head will be guided in the plane of rotation by contact with the surface of said wire, and means for radially moving said sensing head in a direction to oppose said resilient means and in response to centrifugal force depending on the rate of rotation of said mounting means.

3. A rotating probe for testing flaws in wire or the like comprising mounting means having a central aperture adapted to permit the passage of said wire axially therethrough, said probe being rotatable about said wire, a sensing head resiliently attached to said mounting means, and movable with respect thereto radially in a plurality of directions in a plane parallel to the plane of rotation, said sensing head having at least one sensing element adapted to sense variations in an electromagnetic field surrounding said wire, bearing means rigidly attached to said head for spacing said sensing element a predetermined distance from the surface of said wire, said bearing means being adapted to contact the surface of said wire such that the sensing head is radially guided in the plane of rotation by the position of said wire, and means responsive to centrifugal force for moving said sensing head in a direction such that said bearing means contacts the surface of said wire.

4. A rotating probe for testing flaws in wire or the like comprising mounting means having an aperture adapted to permit the passage of said wire axially therethrough, said mounting means being generally concentrically rotatable about said wire, a fixed vertical member rigidly attached to said mounting means, a sensing head attached by resilient means to said mounting means, said resilient means including a generally horizontal spring element attached to each end of said fixed vertical member, a movable vertical member attached to the other ends of said horizontal spring elements, such that said vertical members and said horizontal spring elements form a generally rectangular outer quadrilateral, a lower rigid horizontal member attached to said movable vertical member within said outer quadrilateral, generally vertical spring elements attached at one end each to spaced portions of said lower horizontal member, an upper rigid generally horizontal member attached to the opposite ends of said vertical spring elements such that said upper and lower horizontal members and said vertical spring elements form an inner generally rectangular quadrilateral lying generally congruently within said outer quadrilateral and serving to frame said aperture, means attaching said sensing head to said upper horizontal member so as to depend therefrom, said sensing head having at least one sensing element adapted to sense variations in magnetic field strength surrounding said wire, and bearing means rigidly attached to said head for spacing said sensing element a predetermined distance from the surface of said wire, said bearing means being adapted to contact the surface of said wire such that the sensing head will be radially guided in the plane of rotation by the position of said wire.

5. A probe according to claim 4 wherein a counterweight is attached to said lower horizontal member on a radius of said aperture such as to pull said head toward the center of the aperture when the probe is rotated.

6. A probe according to claim 4 in which additional means are provided for resiliently biasing said mounting means for the sensing head such that, when said head is not being rotated, said heal will be shifted by said additional means away from the aperture in the mounting means.

7. A probe according to claim 6 in which said biasing means comprises a spring element attached to said mounting means and bearing on one of said quadrilaterals, and means for adjusting the effective force of said spring element such that at a predetermined r.p.m. said effecitve force will be overcome and said sensing head will shift toward the center of the aperture.

8. A rotating probe for testing flaws in wire or the like comprising mounting means having an aperture adapted to permit the passage of said wire axially therethrough, said mounting means as a whole being concentrically rotatable about said wire, a sensing head, resilient means by which said sensing head is solely attached to said mounting means, and means responsive to centrifugal force causing said head to move toward said aperture substantially only in the plane of rotation of the probe, said head comprising at least two sensing elements, each of said sensing elements comprising an elongated magnetic core having an inductance coil thereround and disposed so that one end of said core is substantially on a radius of said wire, means for spacing the ends of the cores a predetermined distance from the surface of said wire, and means for connecting the coils to an external circuit.

9. A probe according to claim 8 in which the ends of said cores are spaced by different distances from the center of rotation of said probe whereby the sensing head is adapted to sense flaws in wires within a range of diameters differing by the difference between said distances.

10. A probe according to claim 8 in which said sensing elements are spaced apart axially of the wire such that as the wire passes axially through said probe said sensing elements simultaneously scan different helical paths on the wire.

11. A rotating probe for testing for defects in wire or the like comprising mounting means having an aperture adapted to permit the passage of said wire or the like axially therethrough, said mounting means being generally concentrically rotatable about said wire, a sensing head attached to said mounting means, rotatable therewith and movable with respect thereto in a single plane toward and away from the center of rotation of said mounting means, means for moving said sensing head toward said center of rotation in response to centrifugal force depending on the rate of rotation of said mounting means, and means operable independent of gravity tending to move said head away from said center in opposition to centrifugal force.

References Cited in the file of this patent

UNITED STATES PATENTS

| | | |
|---|---|---|
| 2,441,380 | Zuschlag | May 11, 1948 |
| 2,526,977 | Smith | Oct. 24, 1950 |